United States Patent [19]

Bendarzewski, deceased et al.

[11] Patent Number: 4,946,538

[45] Date of Patent: Aug. 7, 1990

[54] PRECISION APPARATUS FOR PLACING FILAMENTS

[75] Inventors: Robert H. Bendarzewski, deceased, late of Westlake Village, Calif., by Alexandra Bendarzewski, legal representative; Andrew M. Zsolnay, P.O. Box 7554, Burbank, Calif. 91510

[73] Assignee: Andrew M. Zsolnay, Burbank, Calif.

[21] Appl. No.: 291,211

[22] Filed: Dec. 28, 1988

[51] Int. Cl.$^5$ .......................................... B32B 31/00
[52] U.S. Cl. ................... 156/361; 156/433; 156/441; 156/523; 156/517; 156/522; 156/574; 156/538
[58] Field of Search ............... 156/523, 440, 523, 428, 156/430, 433, 441, 574, 361, 538, 583.1, 582, 172, 173, 511, 517, 522; 100/86, 93 R.P.; 242/7.01, 7.21, 7.19; 416/229 R, 230; 29/156.8 R, 110, 121.6, 121.1

[56] References Cited

U.S. PATENT DOCUMENTS

| | | | |
|---|---|---|---|
| 2,704,794 | 3/1955 | Hanson | 29/121.6 X |
| 2,717,285 | 9/1955 | Rayburn | 29/121.6 X |
| 3,345,230 | 10/1967 | McClean | 156/519 X |
| 3,574,040 | 4/1971 | Chitwood et al. | 156/522 X |
| 3,577,297 | 5/1971 | Howard | 156/522 X |
| 3,616,070 | 10/1971 | Lemelson | 242/7.21 X |
| 3,616,078 | 10/1971 | Howard | 242/7.21 X |
| 3,689,349 | 9/1972 | Burger | 156/436 X |
| 3,711,354 | 1/1973 | Burger | 156/362 X |
| 3,775,219 | 11/1973 | Karlson et al. | 156/526 X |
| 3,810,805 | 5/1974 | Goldsworthy et al. | 156/361 |
| 4,133,711 | 1/1979 | August et al. | 156/353 |
| 4,208,238 | 6/1980 | August et al. | 156/523 X |
| 4,234,374 | 11/1980 | Frank | 156/574 X |
| 4,259,144 | 3/1981 | Ballentine | 156/523 X |
| 4,285,752 | 8/1981 | Higgins | 156/523 X |
| 4,292,108 | 9/1981 | Weiss et al. | 156/523 X |
| 4,382,836 | 5/1983 | Frank | 156/523 X |
| 4,461,669 | 7/1984 | Dontscheff | 156/574 |
| 4,508,584 | 4/1985 | Charles | 156/517 X |
| 4,541,886 | 9/1985 | Marlow et al. | 156/574 X |
| 4,557,790 | 12/1985 | Wisbey | 156/523 X |
| 4,560,433 | 12/1985 | Frank | 156/523 X |
| 4,574,029 | 3/1986 | Murray | 156/361 X |
| 4,591,402 | 5/1986 | Evans | 156/574 X |
| 4,696,707 | 9/1987 | Lewis et al. | 156/361 X |
| 4,699,683 | 10/1987 | McCowin | 156/523 X |
| 4,707,212 | 11/1987 | Hailey et al. | 156/523 X |
| 4,776,076 | 10/1988 | Frank et al. | 29/156.8 R |
| 4,790,898 | 12/1988 | Woods | 156/441 X |

Primary Examiner—Michael W. Ball
Assistant Examiner—Jeff H. Aftergut
Attorney, Agent, or Firm—Ashen Golant Martin & Seldon

[57] ABSTRACT

A drum is rotatably mounted next to a tool. Resin-preimpregnated filament tows are independently fed to the drum, through several collimating guides positioned along the drum. The drum operates reciprocally: when it rotates in one direction, segments of the tows are gathered or wound up onto the drum and preheated; upon counterrotation in the other direction the gathered segments are unwound and forcibly compacted against the tool, or against previously laid filaments. In the gathering part of the operating cycle the drum does not translate with respect to the tool, but rather spins in place at a dwell point. In the depositing part of the cycle, however, the drum effectively rolls along the tool (or filament-pack) surface. Heat from the drum penetrates deeply into the pack of already laid filaments, when present, to facilitate generalized consolidation of the workpiece—enough in many cases to make autoclave postconsolidation unnecessary. In addition the drum is capable of shifting axially along the tool surface to lay down a filamentous reinforcement pattern that reflects design stresses in the article being fabricated. Passive or powered tilting is also straightforward, as is arbitrary programmed control on a robotics-type arm.

22 Claims, 10 Drawing Sheets

FIG. 15
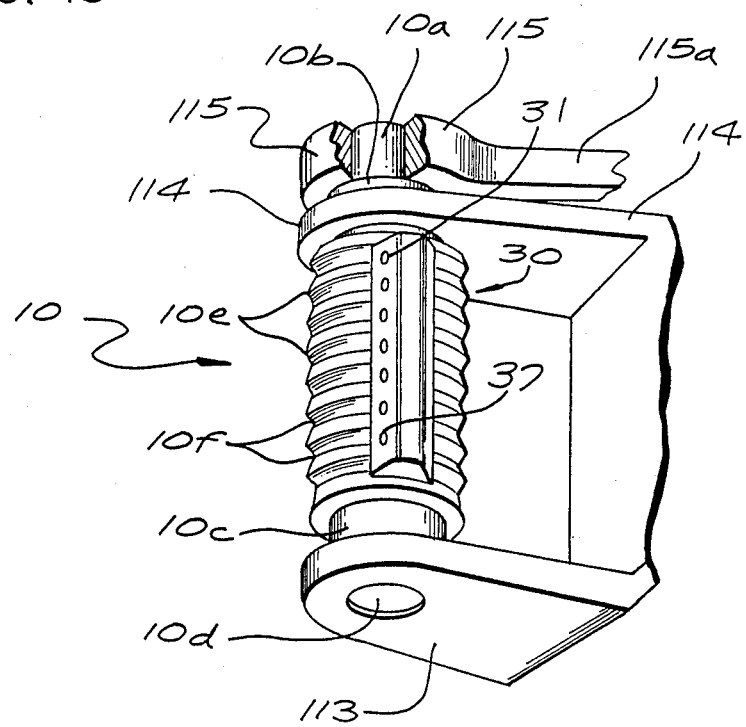
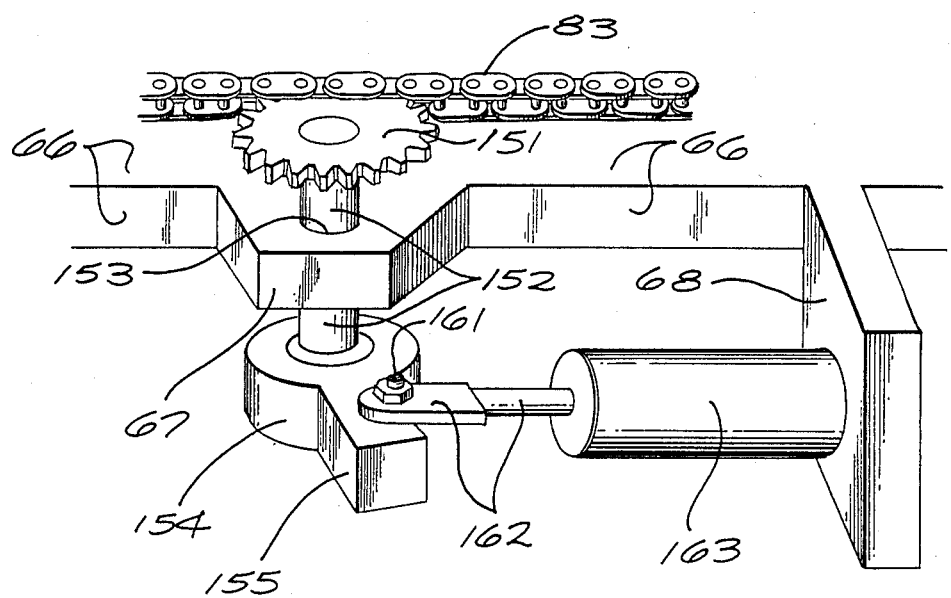
FIG. 16

PRECISION APPARATUS FOR PLACING FILAMENTS

BACKGROUND

1. Field of the Invention

This invention relates generally to machinery and methods for automated placement of fiber reinforcement in manufacture of composite materials; and more particularly to such placement accurately on surfaces of arbitrary three-dimensional contour—including planar surfaces.

2. Prior Art

During the past three decades, high-performance continuous fiber-reinforced polymeric composites have gained a degree of acceptance as a result of their attractive ratio of strength to weight. Composites are particularly well developed in the aerospace, transportation, sporting-goods, and machinery industries.

Primarily because of high material and manufacturing costs, however, use of reinforced composites has heretofore remained an exotic option. With isolated exceptions, composites have been limited in use to a relatively few extremely demanding applications in which cost is a secondary consideration.

Composites differ from traditional engineering materials in that a second material phase, most often a filamentous reinforcement, has been added to obtain specific material characteristics not available from a single unmodified material. The second phase may be added to provide strength, stiffness, toughness or other properties.

By combining filaments with thermoset or thermoplastic polymeric resin, a structure can be fabricated with properties customized to the intended use. Structural properties of such a composite are in part determined by the controlled distribution of one of the materials, the filamentous reinforcement, in a continuous phase of the second, the matrix.

One example of the thermosetting composite materials is epoxy resin reinforced with glass filament—available in forms known as "continuous tow," unidirectional "prepreg," or woven material. A tow (pronounced as in "toe") is a collection of a usually large number of mutually aligned filaments, and is usually assumed to have a generally round cross-section.

Unidirectional prepreg (resin-preimpregnated tape) is the same as a tow except that it usually has a generally flattened cross-section. For simplicity and conciseness in this document, however, the term "tow" is hereby defined to encompass flattened unidirectional prepreg as well as material of generally round cross-section, and also other forms to be mentioned shortly.

Prepreg manufacturing processes include Pulling groups of filaments together through resin baths, so that the resin envelops and generally occupies the spaces between the filaments. In such processes—as well as in some textile-handling processes—shallow comb structures are sometimes or often used as guides to maintain the fibers parallel and in proper lateral spacing, and to prevent their twisting.

An example of thermoplastic composite materials is polyetheretherketone (PEEK) resin reinforced with carbon fiber and available as comingled yarn, unidirectional prepreg or woven material. (The term "fiber" is often used interchangeably with the word "filament," and for present purposes they may be considered equivalent.) Other material forms are available for special applications.

To enable these composite materials to be used in various applications, appropriate fiber-placement techniques are required. Processes now in use to fabricate composite structures from the forms of composite materials described above include (1) manual layup, (2) spray-up, (3) braiding, (4) so-called "pultrusion", (5) filament winding, and (6) tape laying.

Each of these techniques will be discussed below. Implementing these methods, and also blurring some of their definitions, are certain automated devices of the prior art which will also be described below.

For the most part the present invention provides an alternative to these techniques; and for many kinds of projects it is an advancement over all of them. As will be seen, however, the invention also has some potential for use in complementary combinations with certain of these known processes.

In four of the six fiber-placement processes, fibers are placed either on a substrate which will later remain part of the finished article, or on a tool from which the finished article is later separated. The exceptions are braiding and pultrusion, which are used to fashion structural elements for subsequent assembly into more elaborate structures.

After fiber placement, a part fabricated of composite materials is commonly heated and consolidated, often in an oven or autoclave. This process is usually called "curing" the material.

(1) Manual layup in principle may use almost any form of material, but is usually practiced with woven material or wide tape. It is very labor intensive, relatively slow, and not very precise (reproducible) in terms of either positioning or structural qualities—e.g., uniformity of load bearing.

Manual layup does provide maximum versatility, and therefore is extensively used in forming compound shapes. It is also widely used when programming or other elaborate make-ready work for automated fiber placement is not economic, as in one-of-a-kind or short-run items.

(2) Spray-up is an inexpensive manufacturing method used where weight and high directional strength are not critical. A pneumatic device similar to a paint sprayer applies a fiber-and-resin mixture to a substrate or tool.

In spray-up the fibers are necessarily rather short, and are in a generally random distribution of positions and orientations. Finished articles accordingly have low, nondirectional tensile strength, and rough, abrasive surfaces.

(3) Braiding is essentially a weaving process. Fibers pass over and under one another to form a two-dimensional netlike array that is strong in two directions. To a limited extent this braided array of fibers can be shaped into three-dimensional articles before cure.

(4) Pultrusion is like extrusion in some ways: a material, while in a formable condition, is forced through a die to create an extended structural member having a particular structurally useful cross-section. In pultrusion, however, the material before passing through the die is not isotropic and so cannot simply be squeezed hydraulically out of a homogeneous melt.

Rather the object of pultrusion is to incorporate in the finished member longitudinal filaments that impart extremely high tensile strength longitudinally. These filaments accordingly must be suitably oriented within the material before passage through the die.

Thus in pultrusion the filaments and resin together are pulled, rather than squeezed, out through the die. Resulting structural units are cut to suitable lengths or, if thin and flexible enough, rolled onto a storage spool.

Pultrusion is capable of forming relatively large, well-defined members such as cylinders, "I" beams, and so forth. (It could also be used, however, to make specially shaped tows for use with the present invention, in ways which the disclosure of the invention will make clear.)

(5) Filament winding is sometimes considered to be the same as "precision fiber placement." More strictly speaking, filament winding is limited to winding of filaments or tows around a rotating work piece or tool, called a "mandrel," along a circuitous path. Most successfully such a path is diametral or near-diametral, so that the filaments are uniformly tensioned and well anchored against the mandrel until cured.

In fiber or filament placement, by contrast, theoretically any predetermined orderly path may be used in creating any given shape or form. As a practical matter, no apparatus for accomplishing such arbitrary placement has heretofore been available.

(6) The last-mentioned process, tape laying, has been used to fabricate large panels, either three-dimensionally contoured or flat, typically from three-inch-wide, five-mil-thick unidirectional prepreg tape. Several patents have been issued for automatic or semiautomatic equipment to speed up or refine this process.

To form a three-dimensional surface from pieces of tape that are essentially planar is a touchy exercise in approximations and compromises. The process is related to the well-known projection problem of making a two-dimensional map of a three-dimensional curved surface, such as the surface of the earth.

Few patents appear to address directly this problem of forming compound shapes from filamentous composites. One such document is U.S. Pat. No. 4,541,886 of Marlow, Wiltshire and Hulme.

That patent, assigned to British Aerospace PLC, describes a huge automatic machine for laying planar tape, one piece at a time, to make large panels—apparently for aircraft wings or other parts. With the Marlow et al. machine, the task is performed in two steps.

Each length of tape is first individually prelaid on a table, cut in plan, checked, and then transferred by a pair of vacuum-pickup rollers to a final position. The process is preprogrammed to bring each piece of tape near tangency everywhere with the three-dimensional contour beneath it—within the capacity of the tape to distort out-of-plane.

Perhaps the largest machine of this general type is disclosed by August and Huber, assignors to Grumman Aerospace Corporation, in U.S. Pat. No. 4,133,711. Another patent describing a similar device, but said to be relatively light in construction and therefore in shop requirements, is U.S. Pat. No. 4,591,402—issued to Evans and Murray, and assigned to LTV Aerospace and Defense Company. Each of these machines is like the Marlow unit, in laying one piece of planar tape at a time, in a two-stage process, for large panels such as aircraft parts.

Evans et al. describe their device as providing "complex position modifications required for X and Z-axis adjustment, to follow three dimensional mold contours". Their discussion, however, does not solidly confront the projection problem—i.e., the matter of how to make three-dimensionally contoured parts from planar tape.

From this omission it may be assumed that their device like Marlow's is intended for fabrication of aircraft parts that are so large, and whose curvature is so slight, that tape of typical dimensions can be laid down with negligible contour error. For general fabricating work outside the aircraft industry, these simplifying assumptions are seldom applicable.

Another related apparatus is disclosed by Wisbey in U.S. Pat. No. 4,557,790, assigned to Cincinnati Milacron Incorporated. This machine uses many very narrow tows to reduce cutting waste.

Although the use of such narrow tows might also help with the three-dimensional projection problem, Wisbey does not seem to mention this effect. His machine assembles a wide tape from many differential-strip tows, and then transfers the entire assemblage to the workpiece.

Still another device of the same general sort but considerably earlier is U.S. Pat. No. 3,775,219 of Karlson and Hardesty. The assignee is Goldsworthy Engineering Incorporated, of Torrance, Calif.

This machine lays planar tape three inches wide in a single step—that is, directly from a supply roll to a workpiece, without precutting on a work table. The disclosure illustrates a three-dimensional workpiece, but, again, does not seem to address the projection problem.

Other large flatbed machines related to this field are disclosed in U.S. Pat. No. 3,345,230 to McClean, U.S. Pat. No. 3,689,349 and U.S. Pat. No. 3,711,354 to Burger, and U.S. Pat. No. 4,292,108 to Weiss, Hudson and Dowell. These all make planar crosslaid fiber structures.

The McClean and Burger devices make planar crosslaid fiber webs from which articles can then be fabricated. The Weiss et al. machine forms large structural members for aircraft and the like.

Innovations of the Weiss machine appear to lie in the area of trimming complicated edge shapes. Whether it can make contoured structures is not completely clear: the device is said to be used for making "laminated structural members"; and these seem to be "portions of the horizontal and vertical stabilizer skins".

Finally, U.S. Pat. Nos. 4,382,836 and 4,560,433 issued to Frank, and assigned to The Boeing Company, deal with linearly reciprocating applicator heads for laying tape to form articles such as helicopter rotor blades. Each of these applicator heads dispenses and compacts a single planar tape onto a mandrel or other working surface.

The machine operates in both directions, and at the end of each pass either shears the tape or makes an antistress loop as the operator designates.

Frank indicates that his "tape applicator head ... can have as many degrees of freedom of movement relative to the working surface ... as desired. The manner in which this is accomplished is not part of the invention. It is dictated primarily by the shape of the structure to be constructed. Preferably, the tape applicator head ... is mounted for displacement along three mutually orthogonal axes relative to the work surface .... In addition, the head may be rotatable relative to any or all of these three axes."

Limitations of tape-laying apparatus thus include extremely high capital cost and a relatively high degree of specialization of the equipment to particular manufacturing projects, or at least project types. When used in aerospace work, for example, these inordinately expensive machines may pass into extended periods of disuse after completion of particular manufacturing contracts.

Obviously the economics of such overspecialized fabrication equipment are not ideal. These machinery-based tape-laying methods are at the opposite end of the versatility spectrum (as well as the labor-intensiveness spectrum) from the manual-layup approach discussed earlier.

Neither method is adequately economic for general-run fabrication. It can accordingly be understood why manufacture by reinforced composites has heretofore been mostly constrained to certain very valuable products, extremely demanding in strength-to-weight ratio, for which high cost is a small obstacle.

The foregoing discussion of known methods demonstrates that the prior art has made very limited provision for automatically fabricating three-dimensionally contoured surfaces. Aside from manual layup, such surfaces are made in only two situations: diametrally or near-diametrally wound figures of revolution, and very large constructions in which multiple segments of planar tape are individually applied one at a time to build up a desired surface.

For arbitrarily contoured articles of more modest size, neither of these methods will normally be useful. Near-diametral winding clearly operates for only a very limited few kinds of shapes.

Individual application of planar tape segments has three very severe drawbacks for arbitrarily contoured small items. First, in scaling down the automated techniques used for aircraft wings and the like, one rapidly reaches very narrow tape widths—and microscopic tape thicknesses—that would be cumbersome and difficult to handle.

Secondly, also in adapting aircraft-manufacturing methods, one finds that general fabrication of small articles will often entail surfaces far more strongly contoured than aircraft wings and the like. In combination with the problems of scale just mentioned, the necessity for much sharper curves in general fabrication creates very severe questions of feasibility.

Thirdly, material-handling protocols that involve individual handling of incremental strips of material twice may be economic for making multimillion-dollar aircraft, or even hang gliders and top-of-the-line tennis rackets, but do not appear practical for more mundane articles.

Furthermore, although some high-performance articles do justify highcost techniques, even for those articles economy is generally welcome. For example, there is room for cost improvements in short-run production of special aircraft, and in analogous situations in most of the other fields where composites have already become established.

Finally, while the foregoing discussion has focused on forming arbitrary contours, even procedures for forming complicated flat shapes on flat mandrels will bear improvement. Tape-laying may be cumbersome and uneconomic in this context because of desired variations in width, reinforcement direction, etc.

Thus the prior art has not provided adequately for reinforced-composite fabrication of arbitrarily contoured articles, particularly small articles and articles with compound curves. Even laying down a complicated shape on a planar mandrel has been difficult heretofore.

SUMMARY OF THE DISCLOSURE

The invention provides apparatus and method for placing filaments on a tool. The phrase "placing filaments on a tool" is hereby defined to encompass placement of filaments on a substrate that remains part of a finished product, and also placement of filaments on an already laid filament pack when present.

For some purposes the tool and filaments are most properly regarded as part of the context or environment of the present invention. For other purposes, as reflected by the appended claims, the tool and filaments are part of the invention itself.

The apparatus of the invention includes a drum mounted for rotation. The apparatus also includes some means for independently feeding a plurality of tows of filaments to the drum. For purposes of generality in expression of the invention, these means will be called the "feeding means."

The apparatus also includes a plurality of guides for receiving the plurality of tows respectively from the feeding means. The guides are defined along the drum.

The apparatus also includes some means for rotating the drum in a first direction, to wind up on the drum respective segments of the plurality of tows. Again for generality, these means will be called the "gathering means." The gathering means wind the segments up on the drum through the guides.

In addition the apparatus includes some means for rotating the drum in the opposite direction, to unwind from the drum the respective segments of the plurality of tows. Here again these means will be termed the "depositing means."

The foregoing may be a discussion of the apparatus of the invention in its broadest or most general form. To most effectively enjoy all the benefits of the invention, however, certain other features or characteristics are preferably included.

For example, it is preferred that the gathering means and the depositing means in common include some means for rotating the drum in either direction. These will be called the "bidirectional drum-rotating means." It is also preferable to include a controller for automatically operating these bidirectional drum-rotating means.

Preferably the bidirectional drum-rotating means include a bidirectional motor and a power supply connected to energize the motor in either direction selectably. It is further preferred that the controller include a microprocessor connected to control this power supply—including automatic selection of motor direction.

In addition, the gathering means preferably include means for rotating the drum in the first direction substantilly without translation relative to the tool. The depositing means preferably include means for rotating the drum in the opposite direction while translating the drum along the tool.

When the last-mentioned feature is present, the depositing means preferably unwind the segments against the tool, or against filaments previously laid against the tool; and the apparatus further includes means for biasing the rotating drum toward the tool, during operation of the depositing means, to press the segments against the tool or against other filaments previously laid.

The apparatus preferably also includes means for heating the drum. By virtue of this feature, during operation of the gathering means the rotating drum transfers heat to segments being laid—preheating the segments in preparation for depositing them against the tool or other filaments.

The method of the present invention includes several steps:

(1) automatically gathering a plurality of independently fed, substantially parallel segments of tows of filaments;

(2) then automatically depositing the plurality of tow segments against the tool or against previously deposited segments; and (3) then automatically repeating the gathering and depositing steps, in turn, a multiplicity of times.

As with the apparatus of the invention, several features or refinements are preferably added to these steps. For example, it is preferred to use this method with filaments that are rendered tacky by heating—and to add the step of, concurrently with the gathering step, automatically applying heat to the segments being gathered and to some previously deposited segments, if any, between the tool and the segments being gathered.

Numerous other advantageous details of both method and apparatus will be presented in a later section of this document. From what has been said already, however, it may be understood that the present invention escapes the limitations both of uniform flat tape layup, on the one hand, and assembly from individually cut differential strips or tows on the other hand.

This invention in effect creates the equivalent of a customized tape segment of variable length, width or density, and orientation. The invention tacks that segment down in a specified position, by deeper heating at dwell points at both ends as well as pressure all along the segment. It then proceeds to do the same for subsequent segments—without weakening the structure by in any way separating the successive segments.

The width of the individual, independently fed tows is selected for the application at hand. As will be apparent, this width is readily made narrow enough to lie substantially flat on virtually any strongly contoured compound surface being formed. The width is readily made wide enough for efficient, rapid surface coverage on relatively gentle curvatures.

All of these advantages can be optimized within a single fabrication process. To accomplish this, multiple application heads following the principle of this invention are very readily arranged to work on different portions of the same workpiece—either sequentially or concurrently.

Tows of a great range of sizes and properties can be gathered and deposited in accordance with this invention. Miniature units applying only a few hundred filaments in each tow can be developed for efficient manufacture of very small parts. Large industrial units applying unidirectional prepreg tape several inches wide can also be developed to enhance or supplant the cut-and-transfer devices described earlier.

The invention is equally capable of fiber placement on compound surfaces of almost any complexity, and on flat featureless surfaces on which filament-winding equipment would be unable to obtain a starting grip. In special situations even pultruded structural members might be used as tows, and applied in interlocking fashion to generate structures having special properties.

All of the foregoing operational principles and advantages of the invention will be more fully appreciated upon consideration of the following detailed description, with reference to the appended drawings, of which:

BRIEF DESCRIPTION OF THE DRAWINGS

FIG. 15 is a perspective drawing, partially cut away, showing details of the drum structure, its mounting, and its drive mechanism.

FIG. 16 is a perspective drawing of a portion of the FIG. 8 apparatus, taken from the rear and greatly enlarged, showing the arrangement for driving the chain.

DETAILED DESCRIPTION OF THE PREFERRED EMBODIMENTS

Figure 1:
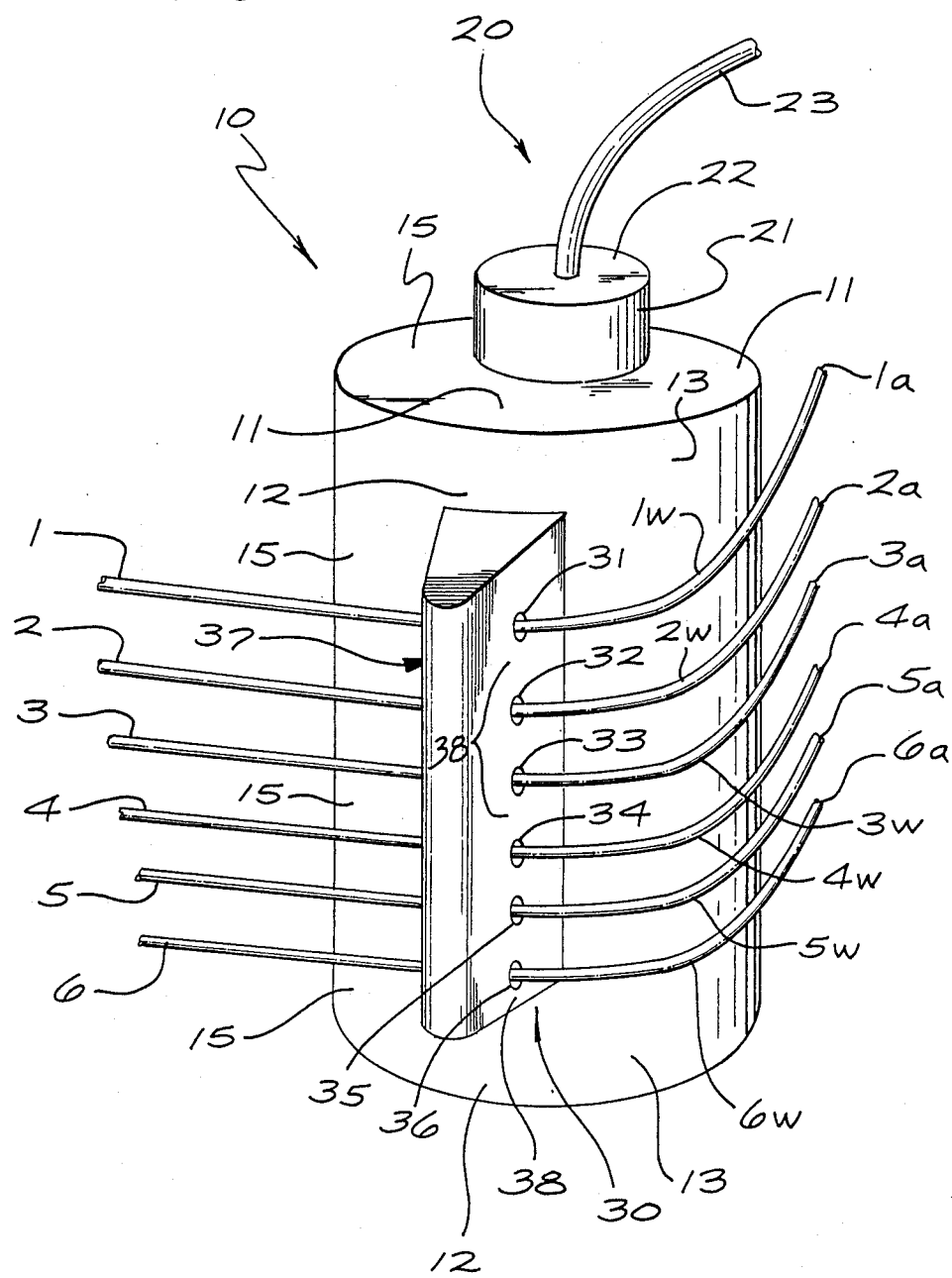
FIG. 1 is a simplified or somewhat schematic perspective drawing of a fiber-placement drum in accordance with a preferred embodiment of the invention.
Figure 2:
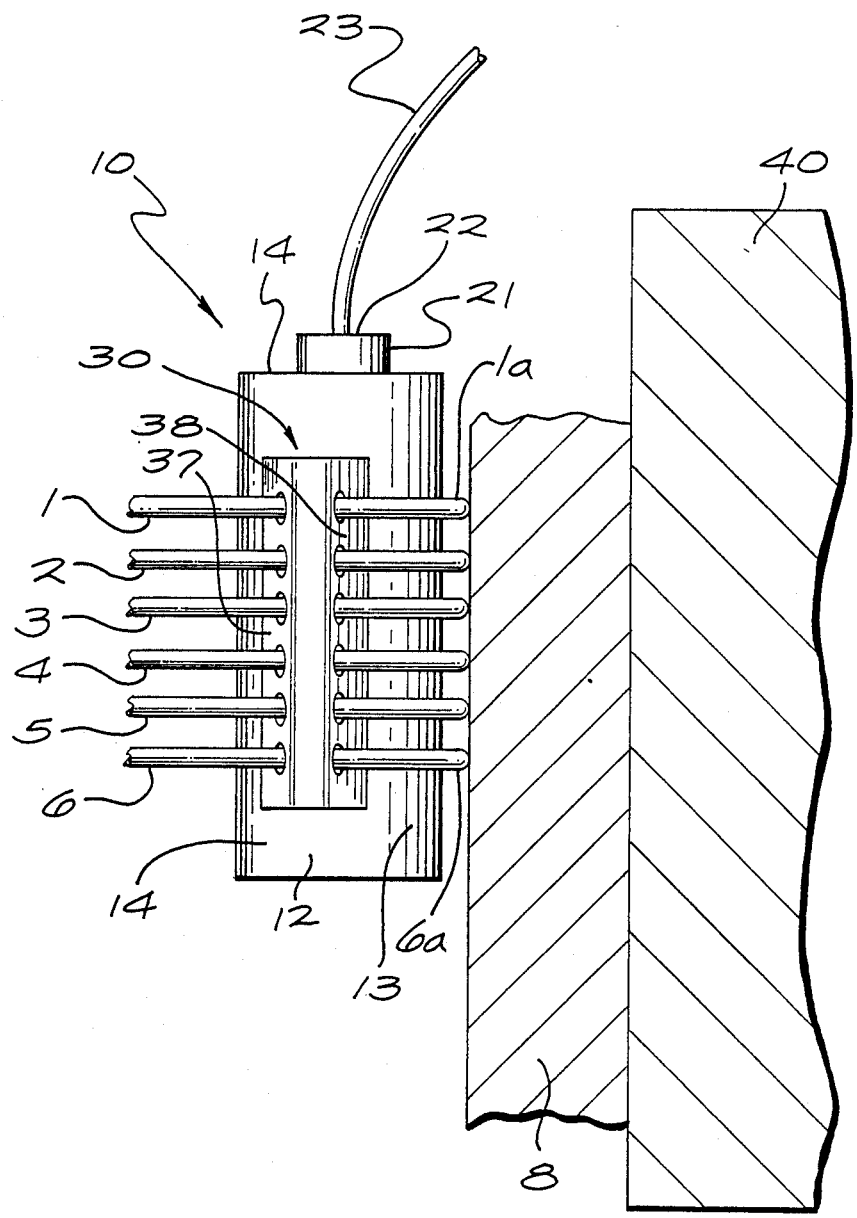
FIG. 2 is an elevation of the same embodiment in use with a representative tool or workpiece. The tool and the pack of already applied filaments are in cross-section.

As shown in FIG. 1, a preferred embodiment of the invention includes a filament-placement drum 10, mounted for rotation. A heating cartridge 20 rides in the hollow center of the drum. Secured to or integral with the drum along a sector 12 of the drum surface is an outward-extending flange 30 in which are formed several guide holes 31 through 36.

Representative filament tows 1 through 6 pass through these holes 31 through 36 respectively. The tows 1–6 are fed from respective supply spools (FIGS. 8 and 9), into the inlet face 37 of the guide flange 30, through the guides 31–36, and out from the outlet face 38 of the flange 30; wrapped as at $1w$–$6w$ around a sector 13 of the drum 10, and applied as at $1a$–$6a$ to the workpiece.

More particularly the tows are applied to a pack 8 of previously applied filaments, when present; or otherwise directly to the tool 40 to begin formation of a filament pack. For simplicity in the appended claims, placement of filaments "on a tool" has been defined as encompassing placement on a substrate that remains in the finished part or on an already built-up pack 8 of filaments when such a pack is present.

The cartridge heater 20 has a circumferential surface 21, passing through the top end surface 11 of the drum 10. As mentioned earlier, this drawing is simplified; it does not show the drum mounting arrangements, which can take a great variety of forms—one of which will be presented shortly. The central cartridge heater 20, however, is a desirable common element in most of such mounting systems. Typically entering through the top end 22 of the heater 20 is an electrical supply cord 23. Also omitted from this drawing are certain preferred surface features, to be introduced below.

In use the drum 10 undergoes rotation in a specialized two-stage reciprocatory operation. In a first stage, shown in FIG. 3, the drum gathers filament tows from the supply; then in the second stage, shown in FIG. 4, the drum deposits these filament tows onto the tool or pack surface.

Figure 3:
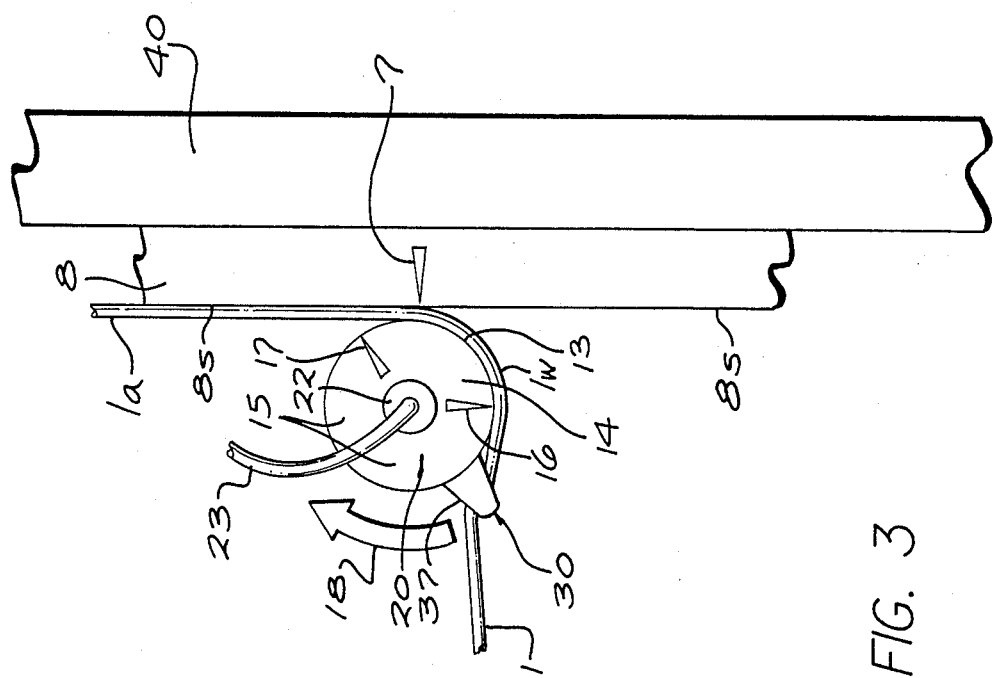
FIG. 3 is a schematic end view of the FIG. 1 drum in a gathering stage of its operating cycle.

In the gathering stage of FIG. 3, the drum 10 rotates in place relative to the tool, at a dwell point. By virtue of this rotation (clockwise as drawn, indicated by the broad arrow 18), the guides in the flange 30 pull tow segments $1w$ from the supply and wrap them about the peripheral surface 13 of a sector of the drum. For convenience of later reference, this surface 13 of a sector of the drum about which the tow segments $1w$–$6w$ wrap may be termed the "working sector" of the drum.

Figure 4:
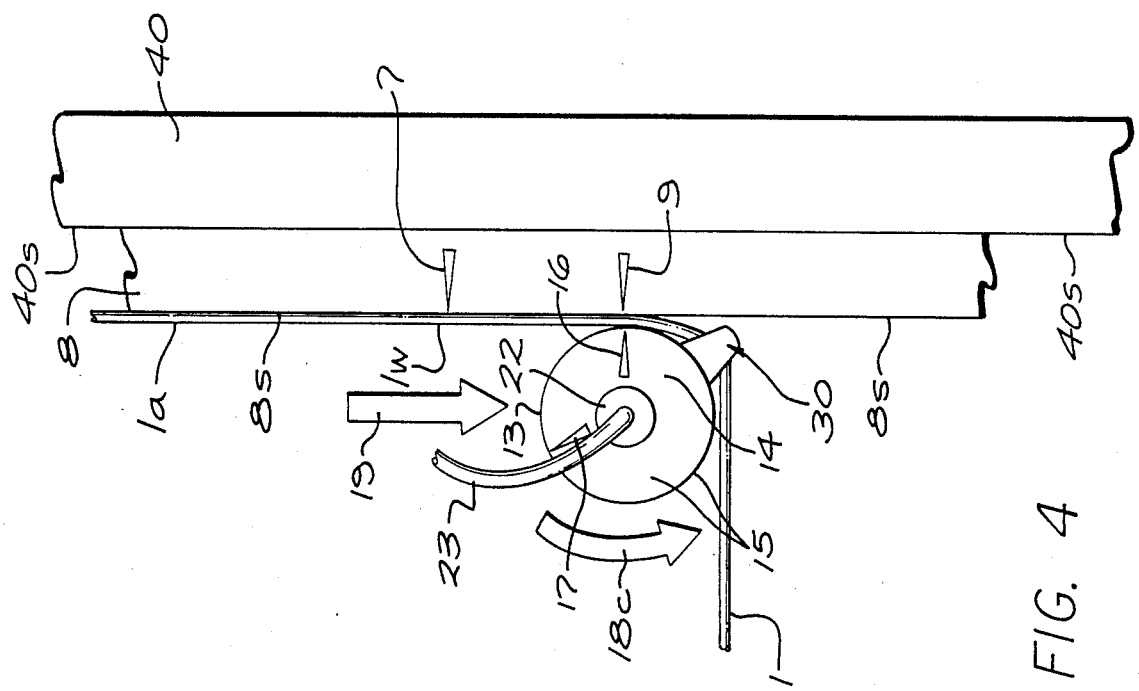
FIG. 4 is a like view of the same drum in a depositing stage of its cycle.

(In the plan views of FIGS. 3 and 4, only the topmost tow 1–$1w$–$1a$ is visible—and the following text will accordingly refer only to that tow. It is to be understood, however, that the phenomena described all occur with respect to the lower tows 2 through 6 as well.)

During this stage of operation, that sector surface 13 is in light contact with tows $1w$, $1a$ already placed against the tool 40—or, again, against the pack 8 of underlying tows laid against the tool 40 in any previous passes of the apparatus. Heat from the axial cartridge heater 20 is conducted through those tows $1w$, $1a$ into the tool 40, or more importantly into the pack 8 when present.

This heat can penetrate deeply into the pack 8, effectively fusing it below and around the line 7 of contact. At the same time the heater 20 prewarms the segments of tows $1w$ that are wrapped around the working sector 13.

In practice, during the gathering stage the drum is backed away from the pack surface to some neutral point at which (1) the drum can spin without excess friction against the tows that are in contact with the tool, but (2) there is still some conduction of heat through those tows into the pack. The amount of heat penetration into the pack during the gathering stage therefore depends on several factors, including the precise amount of "backing away" (e.g., one-eighth inch) for which the mechanism is adjusted, the angular velocity and amplitude (and thus spin duration) at the dwell point, the drum temperature, and the conductivities of the drum and of the tow material in use.

Many of these parameters can be adjusted to accommodate the amount of heat penetration to the kind of fabrication involved. In general there will be tradeoffs between this consideration and others—such as speed of operation, and preferred working temperature of the tows being gathered.

In the depositing stage of FIG. 4, the working sector 13 rolls along the surface $8s$ of the filament pack (or the surface $40s$ of the tool before a pack is established). Relative to the "gathering" rotation 18 already discussed in regard to FIG. 3, this rotation is in the opposite direction (i.e., counterclockwise as drawn, indicated by the broad curved arrow $18c$).

In the course of this rolling counterrotation, the drum also translates along the surface $8s$ or $40s$ (as indicated by the straight broad arrow 19). The drum thereby lays the gathered and preheated tow segments $1w$ against the tool 40 or against previously laid tows 8.

FIGS. 1, 3 and 4 show that there is a point at which each tow segment 1 fed from its respective guide 31 first makes tangential contact with the working sector 13, and in fact becomes part of a wrapped segment $1w$. This point is effectively fixed relative to the drum, and for purposes of definiteness in this document will be called the "first tangency point." In FIGS. 3 and 4, the first tangency point is marked on the top surface 14 of the drum by a slender arrow 16.

When the drum 10 reaches the orientation of FIG. 4, in which the first tangency point 16 is directed against the tool 40 or pack 8, the rolling rotation should halt and the next gathering stage may begin. If preferred the rolling rotation can be stopped earlier, so that the overall oscillatory cycle can be operated further from the first tangency point.

During the depositing stage of operation, an air cylinder or other force-generating device presses the drum 10 firmly against the tow segments $1w$ being laid onto the tool or pack. In this way the tows are tacked effectively while warm, at every point and at the instant of their deposit.

In particular, this force is applied at the starting point of each depositing/rolling stage. At that location and at that time, as will be recalled, the pack has just been subjected to deep penetration of heat during the gathering/dwell stage, and this penetration can be quite deep when that is desirable.

Consequently the pack can be integrated effectively by deep heating and force at each gathering/dwell point, as well as heating during the depositing/rolling stage. Since the dwell points in general are not the same in successive passes, the entire pack usually is firmly integrated as the operation proceeds.

The amount of rotation in each two-stage cycle will vary with the configuration of the part being created. Amplitude of rotation during the gathering cycle in general controls the lengths of the segments available for deposit, and amplitude of rotation during the depositing cycle in general controls the distance between deep-heating firm integration points.

Since the depositing cycle must end when the first tangency point 16 is directed toward the workpiece, or sooner, that orientation defines the most-clockwise angular position at which the next gathering cycle may begin. For purposes of discussion we shall assume that each depositing cycle in fact ends and each gathering cycle begins in that angular position.

With this assumption FIG. 3 represents an angular position in which the gathering cycle has already begun, for the first tangency point has rotated away from the point where the workpiece 8 is tangent to the working sector 13. This point of tangency of the workpiece 8 is marked by a slender arrow 7 in FIG. 3 and will be called the "workpiece tangency point."

As seen in FIG. 3, the tow 1 is angled very steeply to the inlet face 37 of the guide flange 30. To prevent binding of the tow in the guide at this point, the rotary amplitude of drum motion is preferably limited to a position only slightly more clockwise than that shown in FIG. 3. Repositioning the supply route to moderate the illustrated steep angle—and thereby enlarge the amplitude of rotation—is not entirely trivial, for as shown in FIG. 4 the tow 1 is already grazing the drum at the end of the depositing cycle.

Some improvement can be gained by cutting away this interfering rear sector 15 (which as will be seen the tows never contact), or by adopting a special hooklike shaping of the guide flange 30 to stand the incoming tow away from the rear sector, or by installing small rollers inside the guide bar to feed tows more smoothly around the "corner" created at the clockwise end of the rotation, or by shifting the tow supply somewhat with each reciprocation of the drum. Other strategies will come to mind for those skilled in the mechanical arts.

Nevertheless, inherently the entire drum surface cannot be used, as long as a reciprocatory system is employed and part of the drum periphery is occupied by the guide 30. Furthermore there is usually some advantage in relatively closely spaced dwell points since deep-heated integration of the pack 8 occurs at those points.

Accordingly a preferred approach at present is to keep the drum construction, and the tow-feeding mechanisms generally, as simple as possible to maximize their reliability—and to accept a relatively small angular amplitude of operation. This readily achieved amplitude appears to be about one hundred twenty degrees, so that the gathering cycle should halt when the point marked 17 in FIGS. 3 and 4 reaches the workpiece tangency point 7.

The point marked 17 is not as well defined as the first tangency point 16, but there must be some point beyond which the rotation does not continue. For purposes of definiteness in discussion the point 17 will be taken as that point, and will be termed the "last tangency point."

The maximum length of tow 1w that can be wrapped around the working sector 13 is thus defined by the arc between the first and last tangency points 16, 17. Accordingly the maximum length of tow 1w that can be deposited on the pack 8 or tool 40 is the length of tow that can be unwrapped from the same working sector 13, between the same first and last tangency points.

In terms of the workpiece surfaces 8s, 40s, this maximum tow-segment length is defined by the distance between successive workpiece tangency points 7, 9 (FIG. 4) that result from rolling the drum from tangency at the last tangency point 17 to tangency at the first tangency point 16. All this is indicated in FIG. 4.

For many purposes, however, shorter segments 1w are preferred. Some intricate parts require relatively fine filament convolutions. To negotiate sharp curves in such situations, short tow segments can be gathered, deposited, and effectively integrated into the pack between changes of direction.

For straight or less strongly configured articles (or portions of intricate articles), relatively long segments can be used with some enhancement of fabricating speed. In such cases the oscillatory amplitude can be readily increased to one hundred twenty degrees as already indicated, or by more elaborate measures to perhaps as much as two hundred seventy degrees. As already noted, however, appropriate care is required to avoid binding of the tows in the guides.

For many types of work it is desirable to lock the drum so that it does not rotate at all, during selected portions of the operation. For example, on some long straight sections of a workpiece it may be desirable to simply stretch the filaments out in a straight path, without any tacking until later.

As another example, on some convex portions of a workpiece where the path to be followed is substantially diametral, the apparatus can be used to wind filaments around the workpiece very much in the manner of known prior filament winding. Thus the present novel apparatus has the capability to emulate earlier methods for added speed or lower equipment wear, for portions of a job that do not call fully upon its novel operating capabilities.

Figure 5:
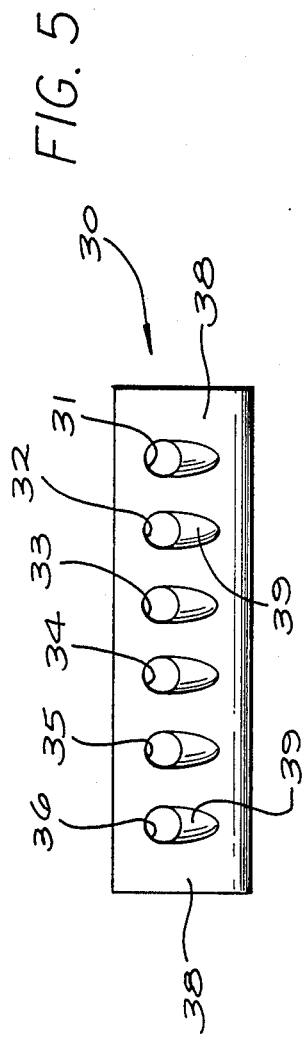
FIG. 5 is an enlarged face view of the tow guides employed in the FIG. 1 embodiment.

FIG. 5 shows a general-purpose guide bar or flange. As shown, it has generally round, closed guide holes or eyelets 31 through 36, appropriate for tows of circular cross-section. Also visible in this view of the exit face 38 are optional exit bevels 39 below the guide holes.

On the entry face 37 (not shown in FIG. 5) similar bevels may be provided both above and below the holes 31-36. At that face the angle of approach of the tows from the supply spools changes more drastically during operation, as is clear from FIGS. 3 and 4.

To minimize friction and to prevent fraying of the filaments, the flange is formed from a self-lubricating substance such as that sold under the trade name Teflon®. The tows are simply threaded through the guide holes.

Both the tow design and the details of guide contour are amenable to straightforward engineering, to optimize the equipment for either intricate detail work or higher-speed broad surfaces. Some limited amount of trial and error will be helpful in such work.

General-purpose tow and guide design, employing tradeoffs between these two extremes, is also straightforward—taking into account the principles set forth in this document. Noncircular drums (cutaway, elliptical, etc.) may also be useful for special applications.

In effectuating the above-described oscillatory cycle of gathering and depositing the filament tows, the drum as already mentioned is driven in translation 19 (FIG. 4) along the tool surface as required for desired placement of the filaments.

Hence the axle 20 will usually be mounted for rolling motion of the drum, biased against the tool surface, in at least one direction orthogonal to its own axis. Such rolling translatory motion—the depositing stage of the overall cycle—generally speaking follows the surface of the tool.

For greatest effectiveness, however, the drum need not merely roll along the surface of the tool. It can also be driven to position and orient filaments along that surface in such a way that the finished article is particularly strong in exactly the places and directions needed for its optimum operation.

Figure 6:
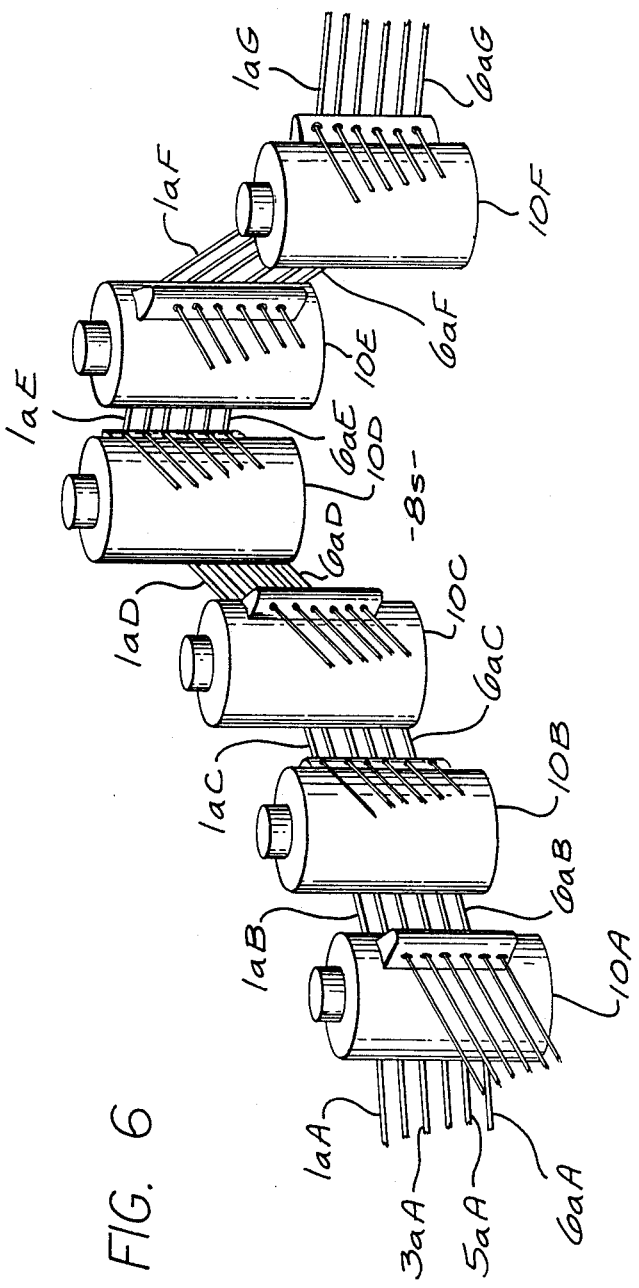
FIG. 6 is a somewhat schematic drawing of the FIG. 1 embodiment in several successive positions along the workpiece, particularly illustrating translation parallel to the axis of the drum.

For this purpose the drum is preferably also capable of simultaneous shifting motion parallel to its own axis. Accordingly as shown in FIG. 6 the drum may pass through successive positions 10A, 10B, and so on through 10F and beyond, along the workpiece, that entail concurrent rotary and axially translatory components of motion.

Operation in these successive positions results in a corresponding succession of very differently oriented tow segments 1aA–6aA through 1aF–6aF, 1aG–6aG, etc., applied to the filament-pack surface 8s. These segments may be quite short where abrupt changes of direction occur.

Where appropriate to the project, the axle 20 may also be mounted for angular motion about axes perpendicular to its own axis. Such angular motion may be passive rotation in compliance with gradual contours of the tool surface. Alternatively it may be driven rotation, to permit fiber placement along a strongly curved tool surface.

People familiar with the art of forming parts will recognize that for maximum versatility the axle 20 can be mounted, in the style of robotics, to a universally mobile arm that also carries the tow supplies and related equipment. Such mounting, with programmed-microprocessor control of the arm and if desired the placement drum as well, may be particularly useful in complicated projects calling for placement of tows from more than one drum.

Figure 7:
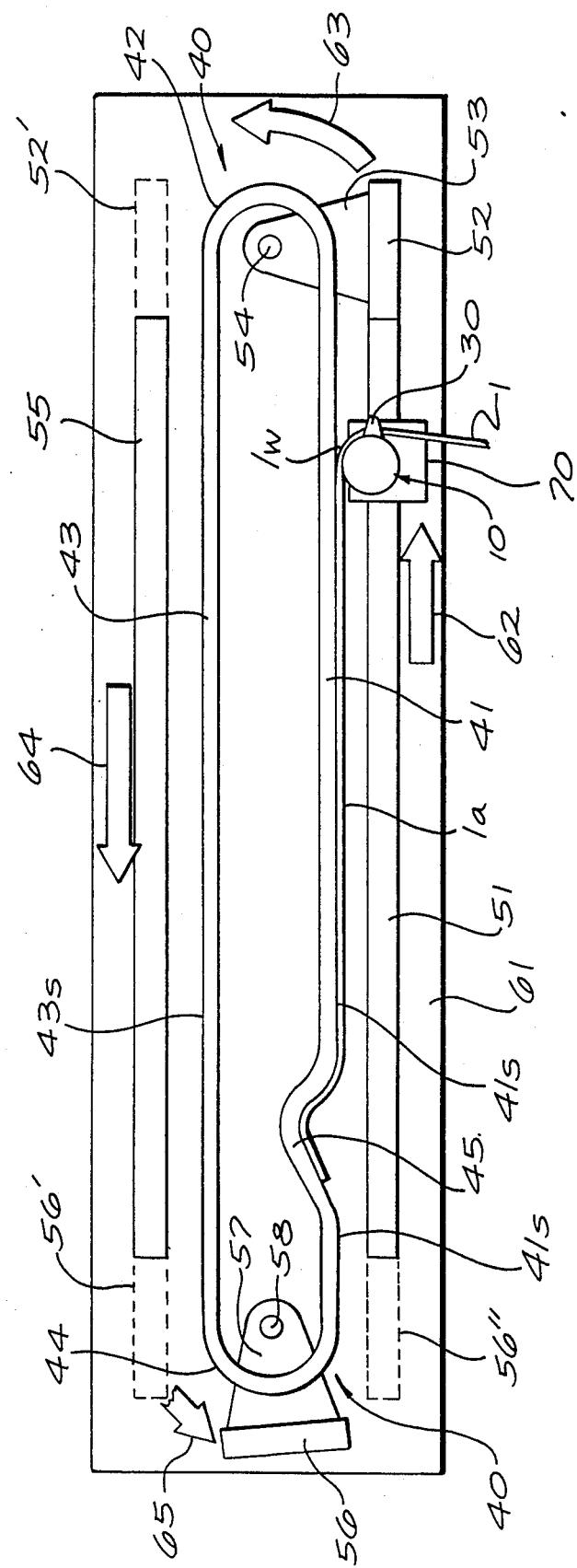
FIG. 7 is a very schematic plan of the same embodiment in use with one type of carriage that permits fiber placement entirely around a tool or workpiece of the general type illustrated.
Figure 8:
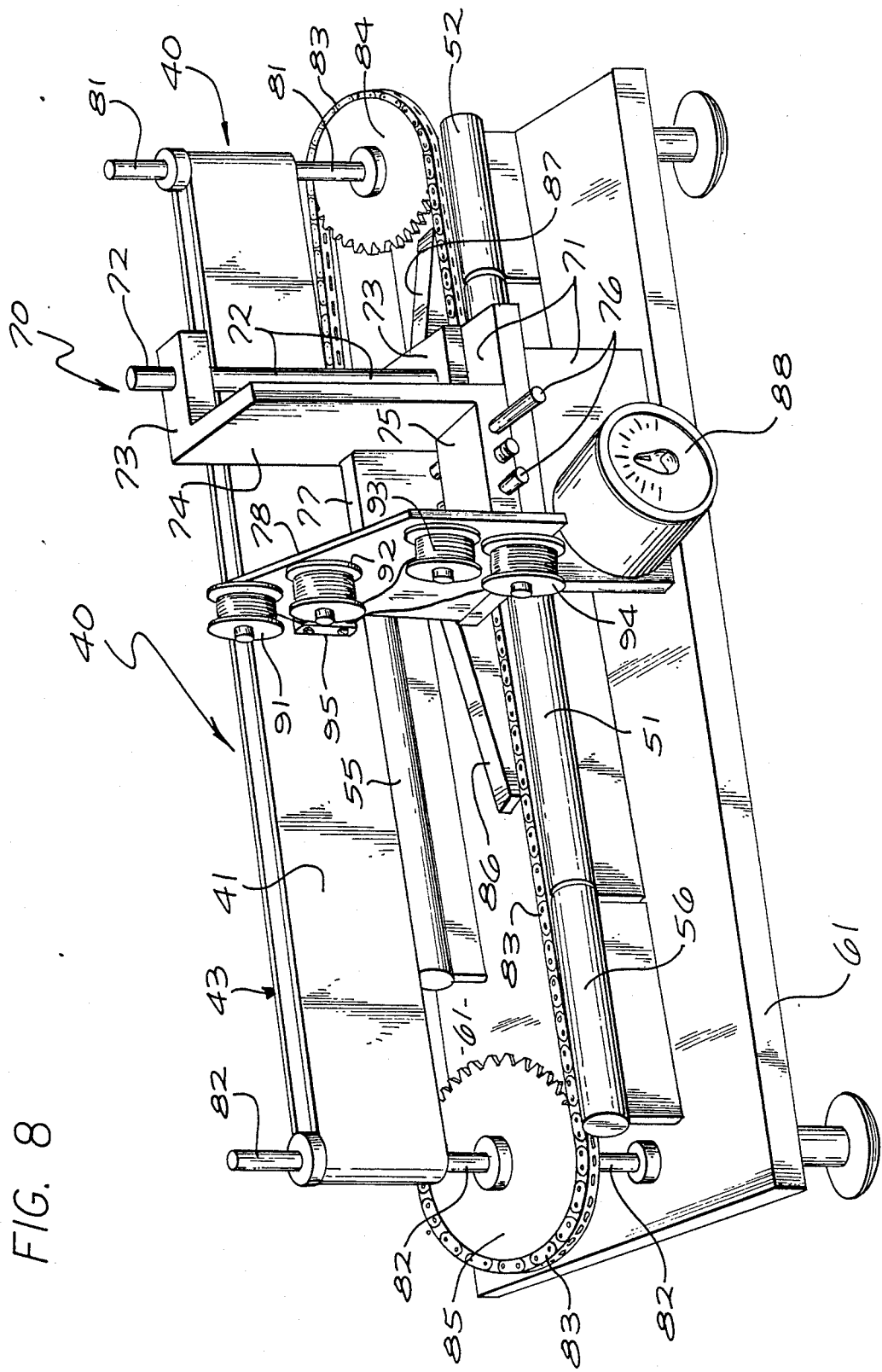
FIG. 8 is a perspective drawing of an inexpensive apparatus, including a carriage, tool, and tow supplies, that implements the strategy diagrammed in FIG. 7 (except that the direction of drum travel is opposite).
Figure 9:
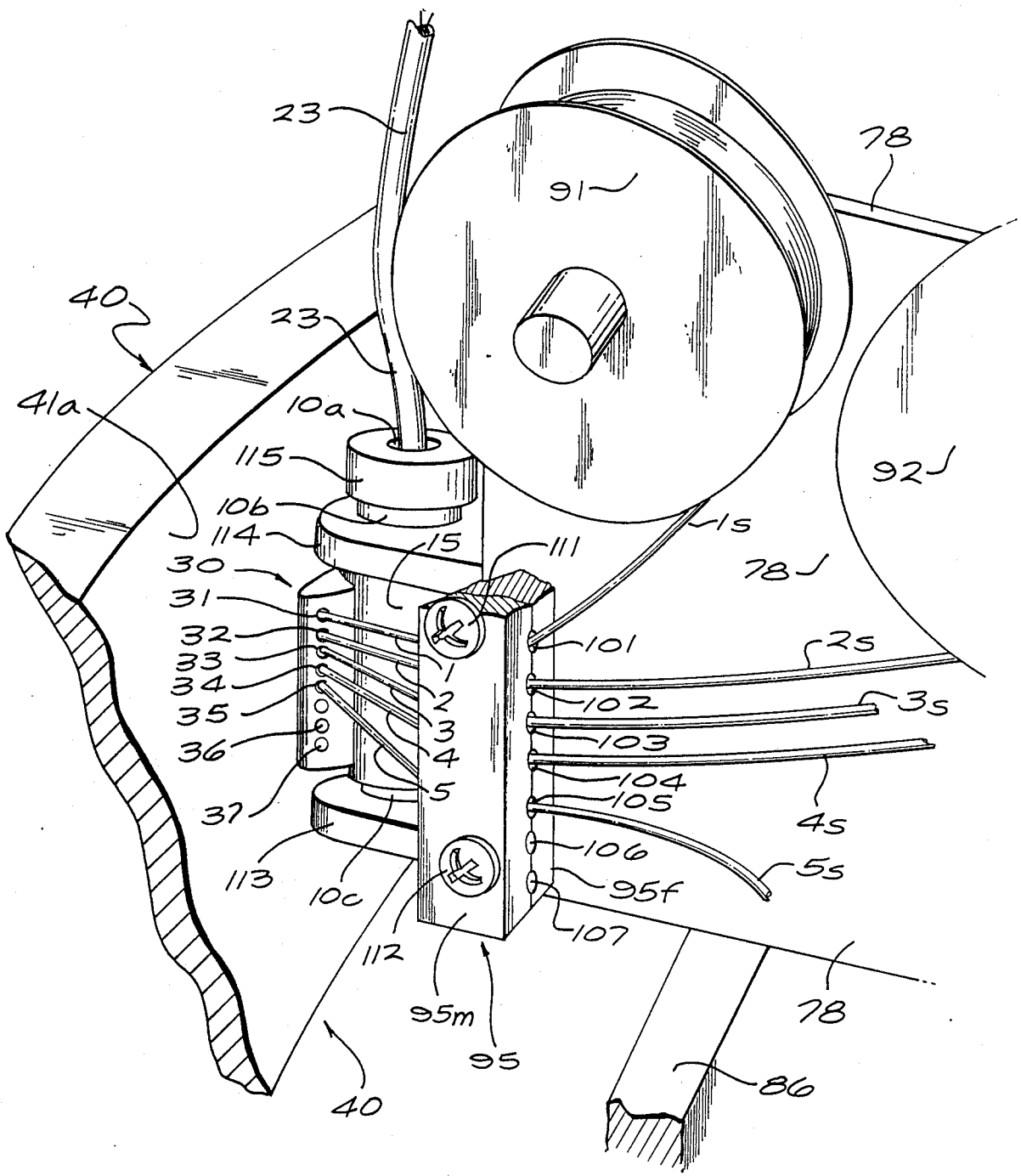
FIG. 9 is an enlarged perspective drawing of the same apparatus, drawn partially broken away, showing in greater detail the fiber-placement drum and tow supplies.

For many purposes, however, a much more modest installation such as that of FIGS. 7 through 9 is entirely adequate. In this example, the workpiece or tool 40 may be a right cylinder, in the geometrical sense—that is, a surface in which all surfaces are vertical, or are otherwise generated as the locus of a line moved parallel to itself around a closed path—although of course it is not a cylinder in the more-common sense of being circular.

As shown in FIG. 7 the tool 40 has two relatively long segments 41 and 43, which may be roughly parallel, and interconnecting them two relatively short curved segments 42 and 44. The tool is mounted on a base 61.

For the sake of simplicity in the drawing, the tool has been illustrated as essentially regular, its two long segments 41 and 43 being mostly substantially straight and its two short curved segments 42 and 44 being substantially circular. The system is not limited, however, to use with such geometrically featureless tool surfaces. To make this fact clear, an arbitrary irregularity 45 has been included in the drawing.

As in previously discussed drawings, the flange guide 30 is shown receiving tow 1 from a supply, and causing a segment 1w of the tow to wrap around the drum 10 for application as at 1a to the surface 41s of the tool segment 41. The drum rides on a carriage 70 that is driven in the direction indicated by the broad arrow 62. As will be recalled, however, this motion is not continuous but rather intermittent—being only the depositing portion of the gathering-and-depositing cycle of the previously discussed drum 10.

For this relatively simplified cylindrical case, no tilting of the drum axis away from the vertical is required. Rather, the placement drum 10 rolls along the surface 41s, tracking the surface by motion inward and outward (that is toward and away from the surface considered generally) to follow any cavity 45 or the like in the surface.

The drum 10 also shifts parallel to its own axis. It thereby moves up and down along the surface as already discussed in relation to FIG. 6.

In moving horizontally and vertically along the surface 41s the placement drum 10 and carriage 70 pass along a relatively long, straight track 51 that generally parallels an extended face 41s of the tool. As will be seen, this track 51 is actually only one of several track sections.

So that the placement drum 10 can move along the opposite tool face 43s too, placing filaments 1a entirely around the tool, the track has another long, straight section 55—which, to accommodate the particular tool shown, is substantially parallel with the first-mentioned similar section 51. To support the carriage in traveling between the two long, straight track sections 51, 55, the track also has two short, straight end sections 52, 56 that swivel around the relatively narrow ends of the tool 40.

More specifically, one end section 52 is mounted by an arm 53 for rotation about an axle 54. The other end section 56 is similarly mounted by another arm 57 for rotation about a respective axle 58.

Traveling in the direction 62, the carriage 70 arrives at the end of the straight track section 51 and runs off the end of that section 51 onto a short end section 52. Upon reaching the center of that end section, the carriage 70 pauses in that position.

The mounting arm 53 of that section 52 then automatically swings about its axle 58, in the direction indicated by the broad curved arrow 63, carrying the track section 52 and carriage 70 around the curved end segment 42 of the tool 40. In this maneuver the appartus can be made to use either of two general control strategies.

First, this motion of the track section 52 may be intermittent—like the motion of the carriage 70 when moving on the longer track section 51. With this approach, the reciprocatory cycle of gathering and depositing tow onto the curved end segment 42 can proceed while the carriage 70 switches tracks.

Secondly, if preferred, the motion of the track section 52 may be continuous. With this approach, the rotary reciprocation of the drum halts entirely, and the tow is simply wound around the curved end segment 42 in the manner of filament winding.

One or the other strategy may be more appropriate for each particular workpiece respectively. The choice will typically depend upon the general shape and relative intricacy of the workpiece design in the area of its end segment.

For example, the end segment of the desired product may have meandering patterns, such as shown in FIG. 6, along the workpiece surface, or may have irregularities in the surface itself, such as the depression 45 shown in FIG. 7. To produce such detailed features, continuing reciprocatory operation of the drum and corresponding intermittent operation of the track section 52 may be preferred. If no such details are to be formed, the filament-winding approach may be preferred for higher speed.

In either event, the track section 52 advances until the short track section 52 reaches an alternative position 52' (shown in dashed lines) that is aligned and abutted with the other long track section 55. The carriage 70 then proceeds, as indicated by the arrow 64, to run off the short track section 52 onto the long track section 55 on the other side 43 of the tool 40—laying tow along the surface 43s of that side 43. Meanwhile the short track segment 52 automatically swings back to its original position in preparation for the return of the carriage 70.

Waiting, aligned and abutted, at the far end of the second long track section 55 is the other short track section 56, in a position 56' (indicated by dashed lines) to receive the carriage 70. As before, the carriage 70 runs onto this second short track section 56 and stops at its centerpoint.

The second short section 56 swings intermittently (along the direction indicated by the broad arrow 65) in an arc about the second curved end segment 44 of the tool 40, returning the carriage 70 to the first-mentioned long track 51. The short track section 56 stops in a position 56" aligned and abutted with that long track section 51, and the carriage 70 moves onto that track section 51 for another pass in direction 62 along the first-mentioned face 41 of the tool.

This sequence of events is repeated many times while the drum applies tow to all the portions of the tool surface where the article is to be formed. If desired, two or more drum-and-carriage combinations can be placed on the same track system (or parallel systems) to work on the same piece at the same time—thereby achieving much higher output, or specialized treatment of particular portions of the workpiece, or both.

If the tool 40 has a significantly different transverse dimension—that is, if the long surfaces 41s, 43s are spaced apart by a distance that is sufficiently different from that of the example—the range of the mechanism (to be discussed shortly) that moves the drum inward and outward may be exceeded. The drum will then be unable to reach all surfaces of the tool.

In such a case, as to the long track sections 51, 55, they may be merely adjusted closer together or further apart. In addition, however, the diametral distances across the arcuate paths 63, 65 must also be adjusted. For this purpose, another swinging-arm pair 53, 57 of different length may be substituted, or if preferred the arms 53, 57 may be made adjustable in length.

Thus generally the shape of the composite track may be adapted to the plan of the workpiece or tool 40. Triangular, polygonal, or very asymmetric layouts can be readily substituted. The modular section arrangement described above works well and offers excellent setup economics for short production runs. A custom-formed track, however, may be straightforwardly substituted when justified by the manufacturing volume in very long runs.

FIGS. 8 and 9 illustrate an apparatus for effectuating the principles described above. The direction of drum travel in these drawings is opposite to that of all the drawings discussed until now.

The apparatus of FIGS. 8 and 9 represents somewhat schematically a prototype which has been constructed and tested, and which is capable of fabricating a half-scale sample of a real workpiece. In these drawings the prototype apparatus has been simplified and rearranged slightly to illustrate the principles of operation without introducing an amount of detail that would be unnecessary for those skilled in the art.

The particular workpiece that can be made with the full-size form of the apparatus shown in FIGS. 7 through 9 is a strap or so-called "flex beam" that is used to tie in operating loads between the main rotor and shaft of a helicopter. After fabrication the actual (full scale) workpiece would be opened up for use.

As shown in FIG. 8, two studs 81, 82 support the workpiece 40 (here shown thinner than in FIG. 7) above the base 61. The same two studs also support respective idler sprockets 84, 85—but for rotation.

These sprockets carry an endless chain 83, one link of which is pinned to the carriage 70. The chain 83 thus drives the carriage 70, in the manner already generally described with reference to FIG. 7. As will be explained in greater detail shortly, an air cylinder, ratchet and drive sprocket move the chain intermittently. In a production device the various force-applying devices such as air cylinders are preferably automatically controlled as for example by microprocessors, but the actual tested prototype lacked such fully automatic controls.

The track sections 51, 52, 55, 56 are also supported from the base 61. The swinging sections 52, 56 are driven by an air cylinder (not shown).

The carriage consists of three mutually movable sub-carriages 71, 73–74–75 and 77–78. The first of these is a moving platform 71 mounted by ball bushings (not shown) or the like for longitudinal motion along the track sections 51, 52, 55, 56.

The vertically depending portion of this platform 71 carries a rheostat for adjustment of power to the cartridge heater 20 (FIG. 1). A vertical rod 72 fixed in the platform 71 acts as a vertical track for motion of the other subcarriages.

The second subcarriage consists of yoke arms 73 extending laterally in one direction from a vertical wall 74, and a guide block 75 extending laterally in the opposite direction from the same wall 74. The yoke 73 slides vertically on the vertical rod 72.

The third subcarriage is a carrier block 77, mounted to glide rods 76 that extend through the guide block 75, for motion toward and away from the workpiece. (If preferred the carrier block may be actually supported on just one of the glide rods 76, and stabilized against rotation by the other glide rod 76. The tested prototype was so constructed.) This carrier block 77 carries a thin wall 78 on which the supply spools 91–94 ride. The carrier block 77 also supports the dispensing head (not visible in FIG. 8) and a manifold friction block 95.

While the chain advances the platform 71 along the track sections 51, 52, 55, 56, the yoke 73 moves vertically along the vertical rod 72 in a programmed fashion to produce the axial shifts discussed above. A cam 86, 87 drives the yoke 73 upward when appropriate, and gravity returns the yoke downward when the cam 86, 87 no longer provides support.

Preferably for simple workpieces the cam 86, 87 is simply fixed relative to the track, and roller-type cam followers (not illustrated) on the undersurface of the second or vertical subcarriage 73–75 ride up and down along the cam. For more-complicated fabrications the cam 86, 87 can be carried on the platform 71 and driven by an air cylinder; or if fine control is not required the subcarriage 73–75 can be driven by the air cylinder directly.

FIG. 9 shows more clearly the mounting of the drum 10 and manifold friction block 95 to the carriage 70—or, more particularly, to the carrier block 77. The manifold block 95 (drawn partly broken away, for a clearer view of the drum top mount) maintains an adjustable, generally uniform level of tow tension at the guide flange 30.

The manifold friction block 95 consists of two sections, a fixed half 95f that is secured directly to the panel 78, and a movable half 95m that is adjustably tightened against the fixed half 95f by a pair of adjustment screws 111, 112. Several friction ports or passageways 101 through 107 are formed through the friction block 95 along the plane between its two halves 95m, 95f.

As can be seen, not all the friction ports 101–107 in the friction block 95 and not all the guide holes 31–37 in the guide flange 30 need be used in any particular application. The supply tows 1s–5s pass from their respective supply reels through the respective friction ports 101–105 under very light and uncontrolled tension- —and then to the guide ports 31–35 in the guide flange 30 under relatively uniform tension.

This approximate equalization is readily accomplished, even though convoluted placement patterns may result in very unequal overall tow lengths being drawn from different spools. In other words, the friction block 95 at least roughly equalizes the tension at the guide flange 30, while supply tows 1s–5s (FIG. 9) are fed from the respective supply spools independently.

In some situations, tow lengths 1s–5s drawn from all the spools are equal on an overall basis, although different tow lengths may be drawn from different spools over relatively short distances. In such situations, variant feed systems may be considered. For example, in one such system all the spools rotate together, but the individual tows are independently tensioned—as by a spring-loaded tension roller for each tow.

For purposes of this document (and particularly for purposes of the appended claims), feeding by either of these systems constitutes feeding the tows independently. In each system the tows are fed independently as seen at the guide flange.

Either of these two feeding arrangements, or others not mentioned here but apparent to those skilled in the art in view of the disclosures of this document, may be employed. It is considered significant in any of such systems, however, that the tows be fed independently as seen at the guide flange, so that different tow lengths can be drawn through the guides as required by the reinforcement pattern or configuration desired for the workpiece.

As will be recalled, a fundamental advantage of the invention is its capability to accommodate structures that are essentially impossible or uneconomic to make from preassembled flat tape. Such structures in particular include out-of-plane contours, and also meandering planar patterns of the type shown in FIG. 6.

Both these types of structures draw different lengths of tows from the several supply spools, at least over short distances. As an example, when the drum follows a curving pattern such as illustrated in FIG. 6, less tow length is used for forming the inside edge 6aD–6a-E–6aF of the curve than the outside edge 1aD–1aE–1F of the curve. Accordingly, enjoyment of the full advantages of the invention calls for some degree of independence in feeding of the several tows respectively.

The nonworking sector 15 of the drum 10 appears in FIG. 9 behind the incoming tensioned tows 1–5. A yoke 113–114 (see FIG. 15) extends rearward, toward the workpiece, from the third subcarriage or carrier block 77. This yoke 113–114 consists of upper yoke member 114 and lower yoke member 113. Bearings 10b and 10c are carried in the upper and lower yoke members 114, 113 respectively.

Formed in or affixed to the top end of the drum 10 is a hollow upper bearing shaft 10a, which turns smoothly in the upper bearing 10b. The bottom end of the drum 10 similarly carries a formed or affixed lower bearing shaft 10d (FIG. 15), which operates smoothly in the lower bearing 10c.

In this way the drum is supported for rotation in the yoke 113–114. A drive collar 115 grips an upper protruding portion of the upper bearing shaft 10a, to rotate the drum. The drive collar 115 has an integral control arm 115a (FIG. 15), which in turn is pinned to the drive rod of an automatically controlled air cylinder (not shown) to produce the reciprocatory rotation described earlier.

If preferred, the air cylinder may be replaced by a suitable electrical solenoid; or both the air cylinder and control arm may be replaced by an airmotor and shaft, or by an electrical motor and shaft, keyed or otherwise linked to e.g. the bottom of the drum. Inserted into the body of the drum through its hollow upper bearing shaft are the heater 21, 22 (not shown in FIGS. 9 and 15) and the end of its electrical supply cord 23.

As shown in FIG. 15, the tow-handling surface of the drum is advantageously formed with a comb-like structure consisting of alternating circumferential shallow grooves 10e and ridges 10f, spaced axially along the length of the drum. The grooves 10e can be generally aligned with respective apertures 31–37 in the guide flange 30.

The comb-like surface structure prevents the tows from twisting, and constrains them in an orderly lateral spacing, as they are fed from the apertures and laid against the workpiece. This feature may be particularly helpful when marked lateral motion is involved, for example in forming a meandering pattern such as that of FIG. 6. This comb structure is thus a very highly specialized adaptation of the concept of combs used in prepreg manufacture and textile processing as mentioned earlier.

One suitable and simple arrangement for driving the chain 83 synchronously with the drum 10 appears in FIG. 16. A small drive sprocket 151 engages the chain 83. The sprocket is keyed to a shaft 152, which is journalled into the base 66, as for example by a boss 67.

Affixed to the sprocket shaft 152 is a collar 154 with a built-in ratchet and an integral control arm 155. A pin 161 fixes this control arm 155 to the piston rod 162 of an air cylinder 163. The air cylinder 163, when repeatedly activated and deactivated, thus advances the chain 83 intermittently in one direction only.

This cylinder 163 and the other cylinder (not shown) that operates the control arm 115a are advantageously controlled from a common air supply, so that the depositing-step forward rotation of the drum 10 is synchronous with the advance of the chain and therefore the stepping motion of the platform 70. In addition the air cylinder (not shown) that presses the third subcarriage 75 against the workpiece is advantageously also controlled from the same air supply.

With a minor modification the apparatus of FIGS. 7 through 9 can be used for making articles that are not right-cylindrical, in the sense explained above, but that are nearly so—i.e., that do not curve too abruptly away from the vertical. For such articles the drum is mounted to tilt passively, or in other words to follow the tool in gradual divergences from the vertical.

People skilled in the art will recognize that an enormous number of useful articles conform to these simple models and therefore can be manufactured with a drum that is not power-tilted. Furthermore, the process need not be limited to making finished articles that are cylindrical or near-cylindrical, for in some situations the layup may be twisted or otherwise rearranged in various ways after removal from the tool and before a final cure.

Figure 10:
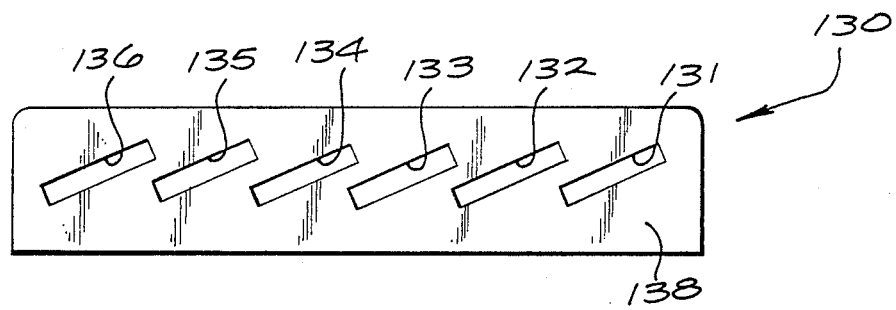
FIG. 10 is a view similar to FIG. 5 but showing a variant form of the FIG. 5 tow guides.

FIG. 10 shows a tow guide flange 130 that differs from that discussed earlier. It is particularly adapted for use with a larger number of flat and relatively wide tows, by having a correspondingly larger number of guide holes 131 through 139 that are particularly shaped for such tows.

The guide holes also are closer together laterally, and angled so that their end regions overlap slightly. With tows and guides of this type, tows can be laid nearly in contact with one another in an approximation of tape-laying—but with far better tolerance for moderate out-of-plane contours.

This unit may be particularly useful for forming relatively broad surfaces that require minimal axial shifting of the sort shown in FIG. 6, and that have only moderate out-of-plane contours.

Figure 11:
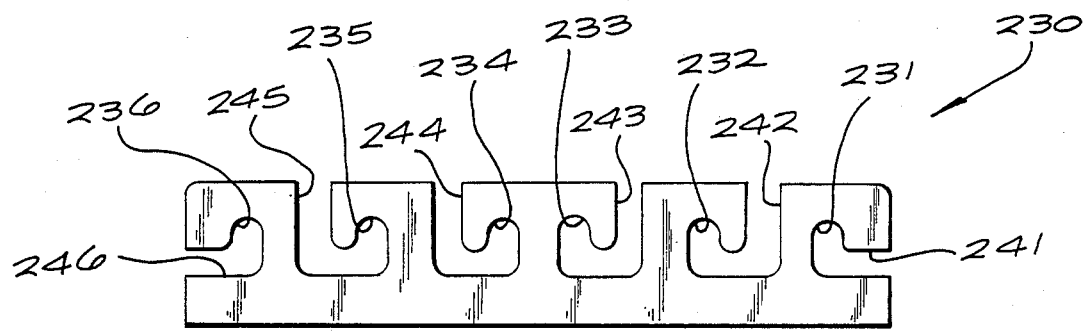
FIG. 11 is a like view of another variant form of the FIG. 5 tow guides.

FIG. 11 shows another guide flange 230 that may be particularly helpful for short-run operations requiring frequent changes of tow type. Here the guide holes 231 through 236 are not closed but rather have respective side-insertion access slots 241 through 246 to permit more rapid starting of tows in the guides. With these features the tows need not be threaded longitudinally into the holes.

Figure 12:
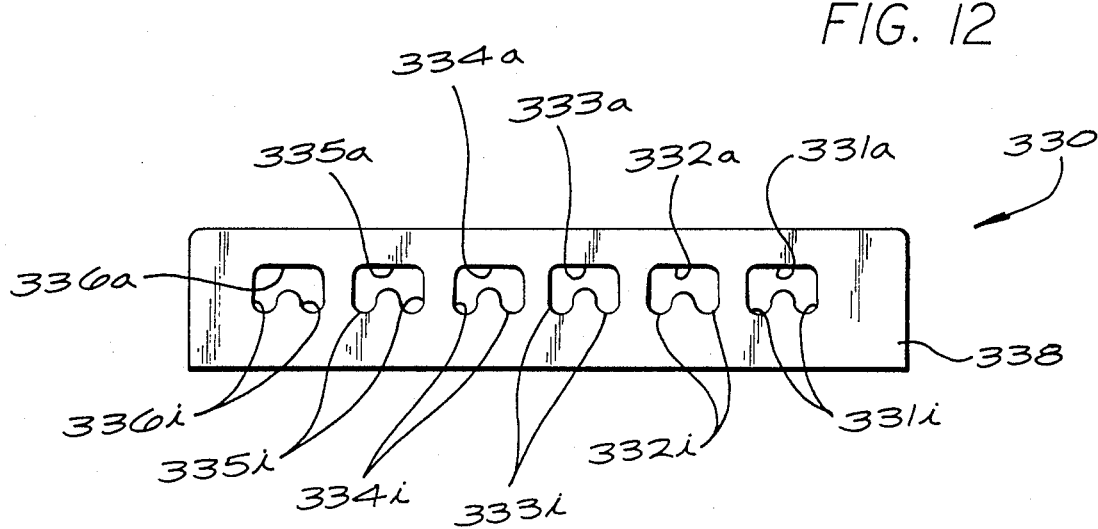
FIG. 12 is a like view of still another variant form of the FIG. 5 tow guides.

FIG. 12 shows yet another type of guide flange 330 for use with tows that are actually formed-cross-section pultrusions—e.g., as shown, small "C" beams. Thus each eyelet has a corresponding shape, formed from an axial (relative to the drum axis) slot 331a, 332a, etc., and at each end of each axial slot two radially inward directed end slots 331i, 332i.

Use of correspondingly shaped tows might have value in special situations, if air entrapment within the pultruded "C" beam cavities can be tolerated. In particular, an article formed using such tows could offer unusually high modulus against bending out of plane, and of course very low weight. The illustrated guide flange 330 orients all the beams similarly, with their open cavities down against the filament pack.

Figure 14:
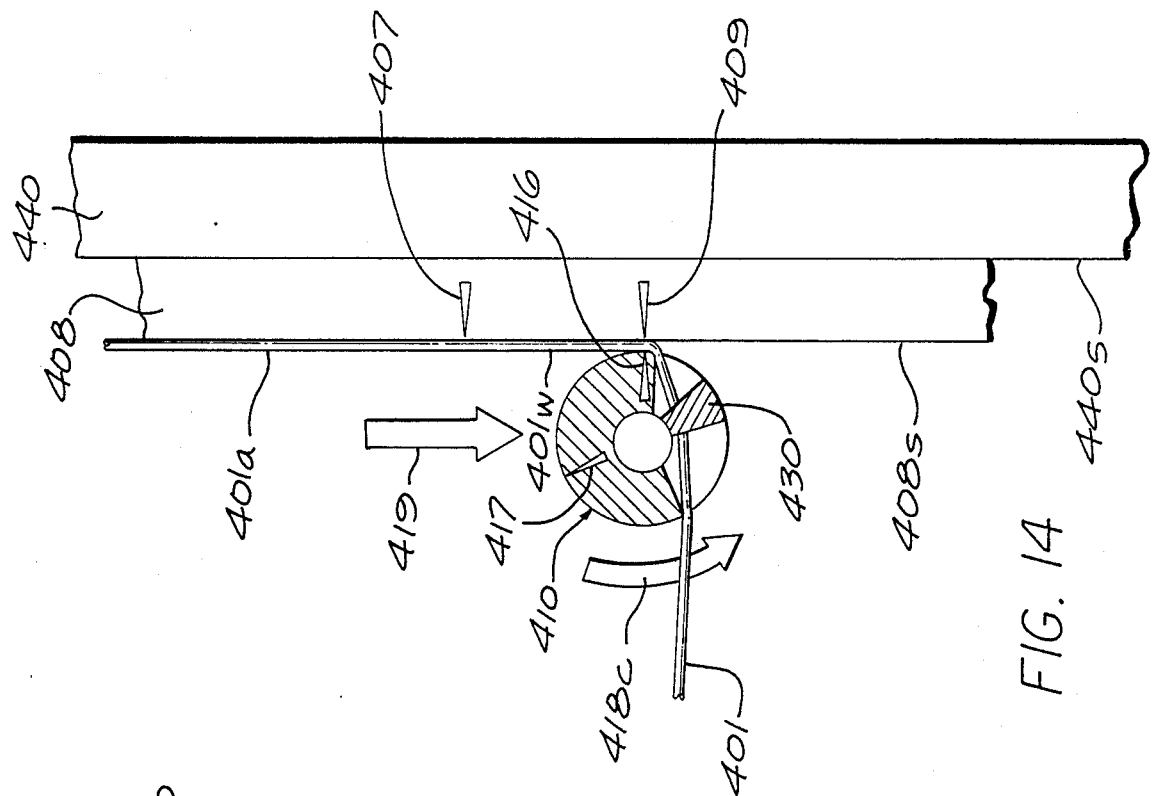
FIGS. 13 and 14 are schematic end views of a fiber-placement drum in accordance with another embodiment of the invention, and showing gathering and depositing stages analogous to those of FIGS. 3 and 4 respectively.
Figure 13:
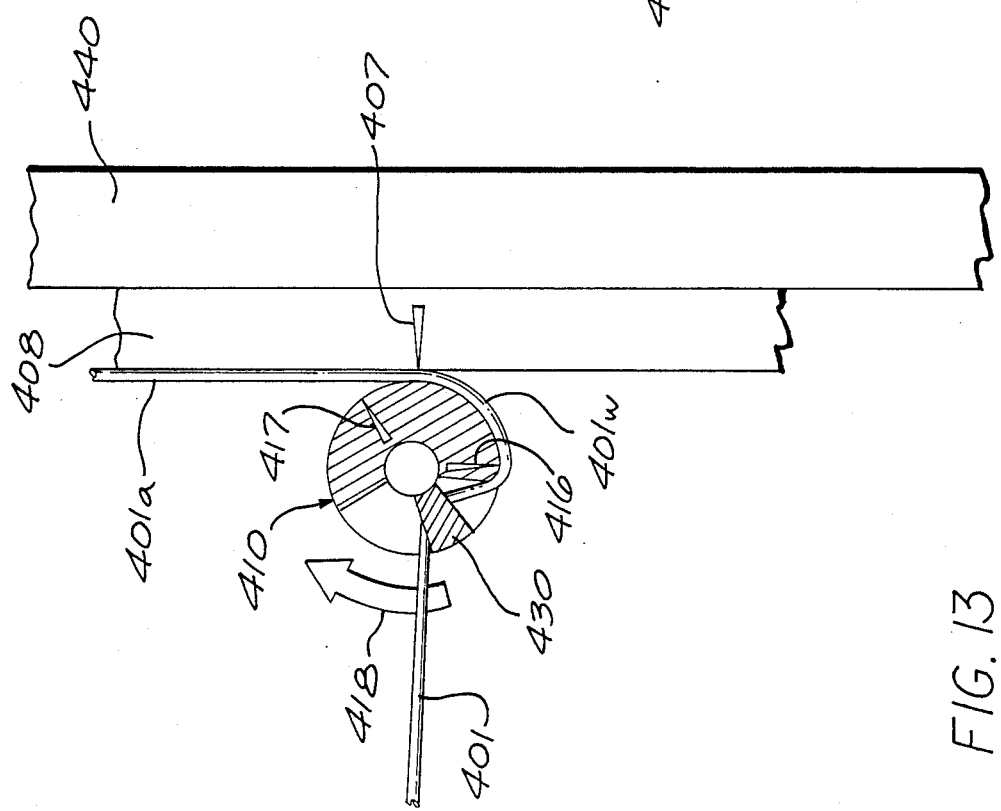

FIGS. 13 and 14 show that the guides need not project radially outward beyond the extrapolated contour of the working surface of the drum. Here the guide eyelets are instead embedded within the drum, by means of a perforated vane 430 that is fitted into a cutaway sector.

FIGS. 13 and 14 show the gathering and depositing stages of operation, directly analogous to FIGS. 3 and 4, illustrating that the function of the device is virtually the same as with the external-flange system. To facilitate comparison, components in FIGS. 13 and 14 that correspond to components in FIGS. 3 and 4 have been marked with the same reference numerals and letters, except for addition of a prefix "4-" or "40-".

Thus in particular the internal or embedded guide vane 430 of FIGS. 13 and 14 corresponds to the external guide flange 30 of FIGS. 3 and 4. Advantages of the previously discussed external-guide configuration include ease of manufacture, slightly less tendency to bind the tows and correspondingly less wear of the guide eyelets, better visibility of the condition of the guides with progressive wear, and easier cleaning.

The embedded-guide system of FIGS. 13 and 14 requires the tows to negotiate a greater number of corners or direction changes than the exterior-guide system—which accounts for its greater binding tendency and greater wear. Nonetheless it is usable and practical.

By studying these two guide geometries, one may appreciate that the guide eyelets could instead be disposed immediately at the drum surface—rather than outside or inside the drum. These various configurations may all be analyzed and evaluated in terms of the length of tow drawn through the eyelets on each rotary stroke, and in terms of amenability to amplitude increase by modifications such as discussed earlier; as well as practical operating considerations discussed in the preceding two paragraphs.

In either of the two illustrated guide geometries (exterior or interior eyelets), or in the third just mentioned (surface eyelets), the operation of the drum follows the same general strategy. As may now be appreciated, in all of these variant forms of structure the drum mimics the operation of a human hand in doing manual layup: it grasps a suitable selected quantity of filaments, positions the filaments in their respective desired locations, and presses them into place.

As previously mentioned, the present invention can use preimpregnated tow or slit tape, consisting of several hundred to several thousand or more unidirectional filaments fused together by a polymeric resin. If preferred the invention can instead use so-called "dry" tows and a resin-mixing head, mounted near the drum or tow supply, to apply resin to the tows just before or at the moment of application. In either event, generally, for the simple machine of FIGS. 8 and 9, tow width can be from 0.05 to 0.25 inch, and the thickness 0.005 to 0.015 inch (except for pultrusions).

These tows are made thin to provide sufficient flexibility to overcome the boardy characteristics of thermoplastic prepreg materials; the present invention does, however, have the ability to soften prepreg to some degree, through operation of the cartridge heater in the gathering stage. Prepreg made with glass fiber, Kevlar ® aramid, carbon, boron or other fibrous reinforcements can all be precisely placed with in situ consolidation.

The invention uses two methods to consolidate the composite part being fabricated: tensioning the incoming tow, and pressure from the rotating drum against the part being fabricated. Although machinery design is application-specific and may vary from one type of fabrication to another, in general terms the invention encompasses the following five functions:

(1) composite tow supply—performed by an array of spools, preferably free to rotate on individual shafts, which store the impregnated fiber tow or slit unidirectional prepreg tape until needed;

(2) tow preheating for higher line speeds and increased productivity—effected by a conductive heat source, preferably an electrical cartridge heater inside the dispensing drum, which provides optimum temperature control and heat capacity;

(3) tow guiding—performed by (a) the dispensing drum as it is, typically, chain driven around the stationary tool on a track, in conjunction with (b) the guide flange that smoothly guides the tows while the drum rotates in place at its dwell point, and holds them in position for deposit while the drum counterrotates;

(4) contact-point heating—accomplished when the dispensing drum rotates against the workpiece, while depositing the tows, to melt both the incoming tow and the mating surface in the local area around the laydown point, to produce ideal fusion between adjacent tows; and (5) tow consolidation (in many cases adequate for full consolidation without additional postprocessing in an autoclave)—produced when the drum is pressed against the workpiece, compressing the material during deposit to prevent undesirable fiber slippage and assure full compaction of the composite part.

As made clear by the foregoing detailed description, the pivotal third function—tow guiding—is performed in a manner which is completely amenable to as many degrees of freedom as needed for the application at hand. The apparatus and method are also compatible with a wide range of filament-placement speeds, workpiece geometries, and heat sources.

Although the exemplary machinery discussed above holds the workpiece fixed to a base while the dispensing head moves about the workpiece, those skilled in the art will readily recognize that the workpiece instead may move while the dispensing head rotates in place. For maximum versatility both the workpiece and dispensing head may undergo translation relative to the base.

The foregoing disclosure is intended to be merely exemplary, and not to limit the scope of the invention—which is to be determined by reference to the appended claims.

What is claimed is:

1. Apparatus for placing filaments on a tool, comprising:
   a drum mounted for rotation;
   means for independently feeding a plurality of tows of such filaments to the drum;
   a plurality of guides, defined along the drum, for receiving the plurality of tows respectively from the feeding means;
   gathering means for rotating the drum in a first direction, to wind up on the drum, through the guides, respective segments of the plurality of tows; and
   depositing means for rotating the drum in the opposite direction, to unwind from the drum said respective segments of the plurality of tows.

2. The apparatus of claim 1, in further combination with:
   such tool; and
   such filaments, in the form of a plurality of tows of such filaments.

3. The apparatus of claim 1, wherein the gathering means and the depositing means in common comprise:
   bidirectional drum-rotating means; and
   a controller for automatically operating the bidirectional drum-rotating means.

4. The apparatus of claim 3, wherein:
   the bidirectional drum-rotating means comprise a bidirectional motor and a power supply connected to energize the motor in either direction selectably; and
   the controller comprises a microprocessor connected to control the power supply, including automatic selection of motor direction.

5. The apparatus of claim 1, wherein:
   the gathering means comprise means for rotating the drum in said first direction substantially without translation relative to such tool.

6. The apparatus of claim 1, wherein:
   the depositing means comprise means for rotating the drum in said opposite direction while translating the drum along such tool.

7. The apparatus of claim 1, wherein:
   the gathering means comprise means for rotating the drum in said first direction substantially without translation relative to such tool; and
   the depositing means comprise means for rotating the drum in said opposite direction while translating the drum along such tool.

8. The apparatus of claim 7:
   wherein the depositing means unwind the segments against such tool, or against filaments previously laid against such tool; and
   further comprising means for biasing the rotating drum toward such tool, during operation of the depositing means, to press the segments against the tool or against other filaments previously laid.

9. The apparatus of claim 8, further comprising:
   means for heating the drum;
   whereby in operation of the gathering means the rotating drum transfers heat to segments being laid.

10. The apparatus of claim 9, wherein:
    the heating means comprise a cartridge heater, disposed at the center of the drum; and
    the cartridge heater also serves as a rotary mount for the drum.

11. The apparatus of claim 1, wherein:
    the guides along the drum comprise a rib extending radially outward from the drum, and a plurality of eyelets formed along the rib.

12. The apparatus of claim 1, wherein:
    the guides along the drum comprise a radial vane disposed within the drum, and a plurality of eyelets formed along the vane.

13. The apparatus of claim 1, wherein:
    the guides along the drum comprise a plurality of eyelets mounted in corresponding cavities in the drum.

14. The apparatus of claim 1, further comprising:
    means for effecting relative displacement and tilting of the drum and such tool, during operation of the depositing means, to arbitrarily selected relative positions and orientations.

15. The apparatus of claim 14, wherein:
    the effecting means comprise means for shifting the drum axially during operation of the depositing means.

16. The apparatus of claim 14, further comprising:
    a base;
    a carriage movably mounted to the base and carrying the drum; and
    means for supporting such tool relative to the base.

17. The apparatus of claim 15, wherein:
    the tool-supporting means are movably mounted to the base.

18. The apparatus of claim 16, wherein:
    the relative-displacement-and-tilting means comprise automatically controlled means for moving both the carriage and the tool-supporting means independently relative to the base.

19. The apparatus of claim 1, wherein:
    the feeding means comprise a plurality of independently operated supplies of such tows.

20. The apparatus of claim 1, wherein the feeding means comprise:
    a commonly operated supply of at least two such tows, such at least two tows being separate from one another; and
    respective means for tensioning each of the at least two separate tows substantially independently.

21. Apparatus for placing filaments on a tool, comprising:
    a drum mounted for rotation;
    means for independently feeding a plurality of tows of such filaments to the drum;
    a plurality of guides, defined along the drum, for receiving the plurality of tows respectively from the feeding means;
    gathering-and-depositing means, including bidirectional drum-rotating means and a controller to automatically operate the bidirectional drum-rotating means, for rotating the drum alternatingly:

in a first direction, to wind up on the drum, through the guides, respective segments of the plurality of tows, and in the opposite direction, to unwind from the drum said respective segments of the plurality of tows.

22. The apparatus of claim 21, further comprising:
a comb-like structure, having shallow grooves encircling at least part of the drum and respectively aligned with the guides, for minimizing twisting and maintaining parallelism of such filaments.

* * * * *